US006897833B1

(12) United States Patent
Robinson et al.

(10) Patent No.: US 6,897,833 B1
(45) Date of Patent: May 24, 2005

(54) PORTABLE USER INTERFACE

(75) Inventors: Ian Nevill Robinson, Mountain View, CA (US); Gary David Sasaki, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 605 days.

(21) Appl. No.: 09/394,199

(22) Filed: Sep. 10, 1999

(51) Int. Cl.[7] ................................................. G09G 5/00
(52) U.S. Cl. ........................ 345/2.3; 345/156; 715/740
(58) Field of Search ............................... 345/329, 1, 2, 345/3, 156, 522, 332, 326, 169, 173, 1.1, 2.1, 2.2, 2.3, 87; 715/717, 733, 734, 738, 740

(56) References Cited

U.S. PATENT DOCUMENTS 5,687,096 A * 11/1997 Lappen et al. ................. 345/2
5,969,696 A * 10/1999 Stoye ............................. 345/1
6,084,584 A * 7/2000 Nahis et al. .................... 345/2
6,138,164 A * 10/2000 Kobata et al. .................. 345/2
6,219,695 B1 * 4/2001 Guttag et al. ................... 345/2

* cited by examiner

Primary Examiner—Dennis-Doon Chow

(57) ABSTRACT

A portable user interface that provides remote access to the capabilities of a desktop computer system. The portable user interface includes a base station that obtains image and/or other data from the computer system. The image and/or other data may be generated by any of the wide variety of available applications for the computer system using the powerful resources of the computer system. The base station compresses the data, and transmits the data via a communication link. The portable user interface includes a screen-pad that receives the data via the communication link, decompresses the data, and displays an image defined by the image data and renders other data as appropriate. The screen-pad relays keyboard, mouse, and other data back to the base station via the communication link and the base station provides the data to the computer system as if from a local keyboard and mouse, etc.

20 Claims, 3 Drawing Sheets

PORTABLE USER INTERFACE

BACKGROUND OF THE INVENTION

1. Field of Invention

The present invention pertains to the field of computer systems. More particularly, this invention relates to a portable user interface.

2. Art Background

Computer systems typically provide users with access to a wide variety of digital information and services. For example, desktop computer systems usually provide a wide variety of applications along with Internet access. In addition, desktop computer systems commonly provide powerful processing and memory resources and graphics capabilities. A typical desktop computer system includes a large display and a box or tower that houses resources such as processors, memory, and mass storage, etc. Such a desktop computer system may also include a variety of peripheral devices such as printers, scanners, and communication devices such a modems, etc.

A variety of applications in home and commercial environments may benefit from portable access to the types of digital information and services provided by desktop computer systems. Unfortunately, the relatively high weight and large bulk of the display and tower arrangement of desktop computers usually precludes their use in portable applications.

A variety of systems exist that provide portable access to computer-based information. Such systems include laptop and tablet computers, wireless Internet appliances, and thin client devices. Each of these types of systems has a variety of disadvantages.

Laptop and tablet computers are portable but are typically more costly and less capable than desktop systems. In addition, laptop and tablet computers usually have fewer available peripherals in comparison to desktop systems and the peripherals that are available usually have a higher cost in comparison to desktop systems. Moreover, laptop and tablet computers are usually not upgradeable, and are therefore prone to more rapid obsolescence in comparison to desktop systems.

A typical wireless Internet appliance is a computer having a tablet-like form factor along with sufficient processing resources for executing a web browser. Such an appliance usually communicates with a base station via a wireless link and the base station is usually connected via modem to access the Internet. Unfortunately, the limited resources that make such devices portable usually cannot support the wide variety of powerful applications that are available to desktop systems. In addition, such limited resources usually precludes multimedia handling of audio, video, and 3D graphics which are commonly available with desktop systems. Moreover, such appliances usually have non-standard operating systems which limit the availability of web browser plug-ins in comparison to desktop computer systems. Furthermore, such systems are usually not upgradeable and are therefore subject to rapid obsolescence.

A thin client device usually includes a processor and a wireless link to a desktop computer. The wireless link is typically used to relay graphics system calls from the desktop computer to the processor in the portable display which then renders the image. Unfortunately, such an arrangement usually limits the type of graphics that is supported in comparison to desktop computers. In addition, such an arrangement is usually unsuitable for applications such as steaming video and video games due to the relatively low bandwidth of the wireless link in comparison to the high bandwidth CPU/graphics data paths in desktop systems.

SUMMARY OF THE INVENTION

A portable user interface is disclosed that provides remote access to the capabilities of a desktop computer system. The portable user interface provides space saving and portability but without the costs, inflexibility or rapid obsolescence of prior portable systems. The portable user interface includes a base station that obtains image and/or other data from the computer system. The image and/or other data may be generated by any of the wide variety of available applications for the computer system using the powerful resources of the computer system. The base station compresses the data, and transmits the data via a communication link. The portable user interface includes a screen-pad that receives the data via the communication link, decompresses the data, and displays an image defined by the image data and renders other data as appropriate. The screen-pad relays keyboard, mouse, and other data back to the base station via the communication link and the base station provides the data to the computer system as if from a local keyboard and mouse, etc.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
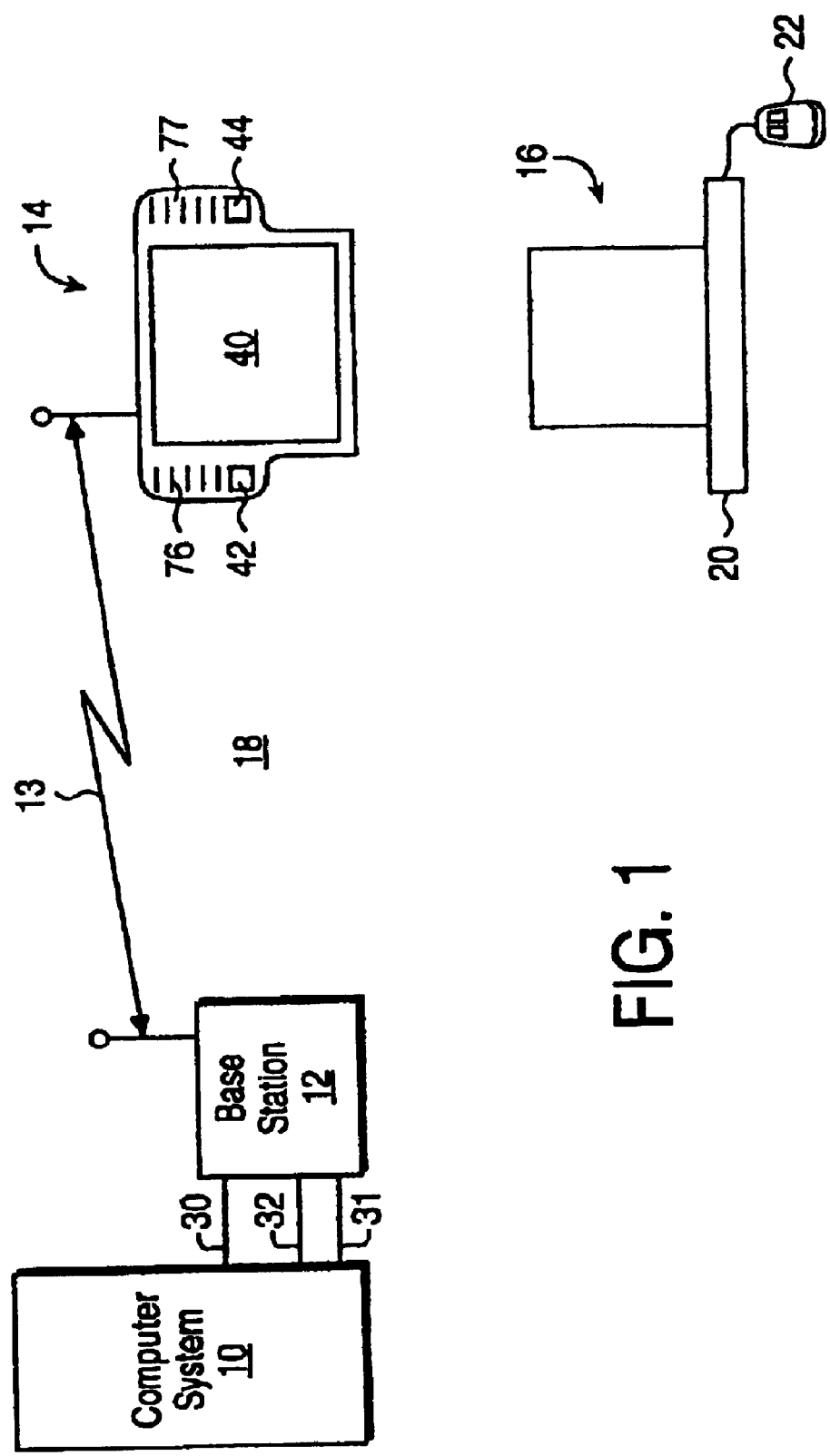
FIG. 1 shows a system that embodies a portable user interface according to the present teachings.

FIG. 1 shows a system 18 that embodies a portable user interface according to the present teachings. The system 18 includes a computer system 10, a base station 12, and a screen-pad 14. Also shown is a screen-pad station 16.

The screen-pad 14 includes a display 40 along with built-in functionality for providing the equivalent of keyboard and mouse functions. Some embodiments of the screen-pad 14 also provide built-in audio functionality. In one embodiment, the display 40 is a flat panel display which enhances the portability of the screen-pad 14. The keyboard functionality of the screen-pad 14 in one embodiment is provided by a touch panel over the display 40 with a pop-up on-screen keyboard rendered on the display 40. Other embodiments of the screen-pad 14 include an attached keyboard and/or mouse.

The screen-pad station 16 is used to charge batteries contained in the screen-pad 14. The screen-pad station 16 also provides connections for a keyboard 20 and a mouse 22 for use when the screen-pad 14 is docked to the screen-pad station 16.

The base station 12 communicates with the screen-pad 14 via a communication link 13. In one embodiment, the communication link 13 is a wireless communication link. In other embodiments, the communication link 13 may be a wire-based network. In a home environment, the network may be implemented using phone lines or power lines, etc.

The base station 12 connects to the computer system 10 via display port 30 and a set of input/output ports 32–34. The ports 30–34 are preferably the same ports that would otherwise connect the computer system 10 to a display and keyboard/mouse as well as audio. For example, if the computer system 10 conforms to what is commonly referred to as the PC architecture, then the port 30 may be a VGA port, the port 32 may be a line out or speaker port suitable for audio connections, and the port 34 may be a PS/2 port, a serial port, a USB port, and/or other port suitable for keyboard and mouse connections.

The base station 12 receives image data from the computer system 10 via the port 30. The image data is a stream of pixel data values that may be computer generated text, 3D graphics and/or video. The base station 12 compresses the image data, and relays the image data to the screen-pad 14 via the communication link 13. The screen-pad 14 decompresses the received image data and enders the image data on the display 40. The base station 12 compresses raw picture information in he form of pixel data values that would normally go to a local computer monitor down to a data sequence that is suitable from transmission within the band width limitations of the communication link 13.

The base station 12 receives audio data from the computer system 10 via the port 32, compresses the audio data, and relays the compressed audio data to the screen-pad 14 via the communication link 13. The screen-pad 14 decompresses the received audio data and plays the audio on a set of speakers contained in screen-pad 14.

The portable user interface embodied in the system 18 is well suited to the home environment where it enables users to access all of the capabilities of the computer system 10, a tower-based home PC for example, from anywhere in a home. This enables the placement of the computer system 10 in an out of the way location in the home or at a location with available phone and power connections, etc., while enabling its use from anywhere in the home and enabling its use by multiple users. The capabilities of the computer system 10 accessed using portable user interface may include a wide variety of available application programs as well as powerful processing resources including mass storage and high performance 3D graphics, etc. This yields the capabilities and cost advantages of a tower-based computer in the comparatively small space taken up by the screen-pad 14.

The screen-pad 14 when docked to the screen-pad station 16 may be used in conjunction with the keyboard 20 and the mouse 22 while using applications and capabilities and services provided by the remotely located the computer system 10. This yields the capabilities and cost advantages of a tower-based computer in the comparatively small space taken up by the screen-pad 14 and the screen-pad station 16.

The screen-pad 14 includes a set of controls 42–44. The controls 42–44 may include scrolling controls, left and right mouse buttons, brightness and contrast for the display 40, audio volume, game and other function-specific controls, as well as keyboard function buttons such as ESC, CTRL, ALT, DEL, etc.

The screen-pad 14 in one embodiment includes a touch panel that enables keyboard-like entry when the screen-pad 14 is away from the screen-pad station 16 and its keyboard 20. Software executing on the computer system 10 generates a pop up on-screen keyboard for text entry via the touch panel and the keyboard image is relayed to the screen-pad 14 by the base station 12. The touch panel also enables mouse-like cursor control and URL selection by touch when the screen-pad 14 is away from the screen-pad station 16 and its mouse 22.

In some embodiments, the screen-pad 14 may have an attached keyboard and/or pointing device for use when away from the screen-pad station 16 as an alternative to the use of a touch panel for keyboard and pointing functions.

Figure 2:
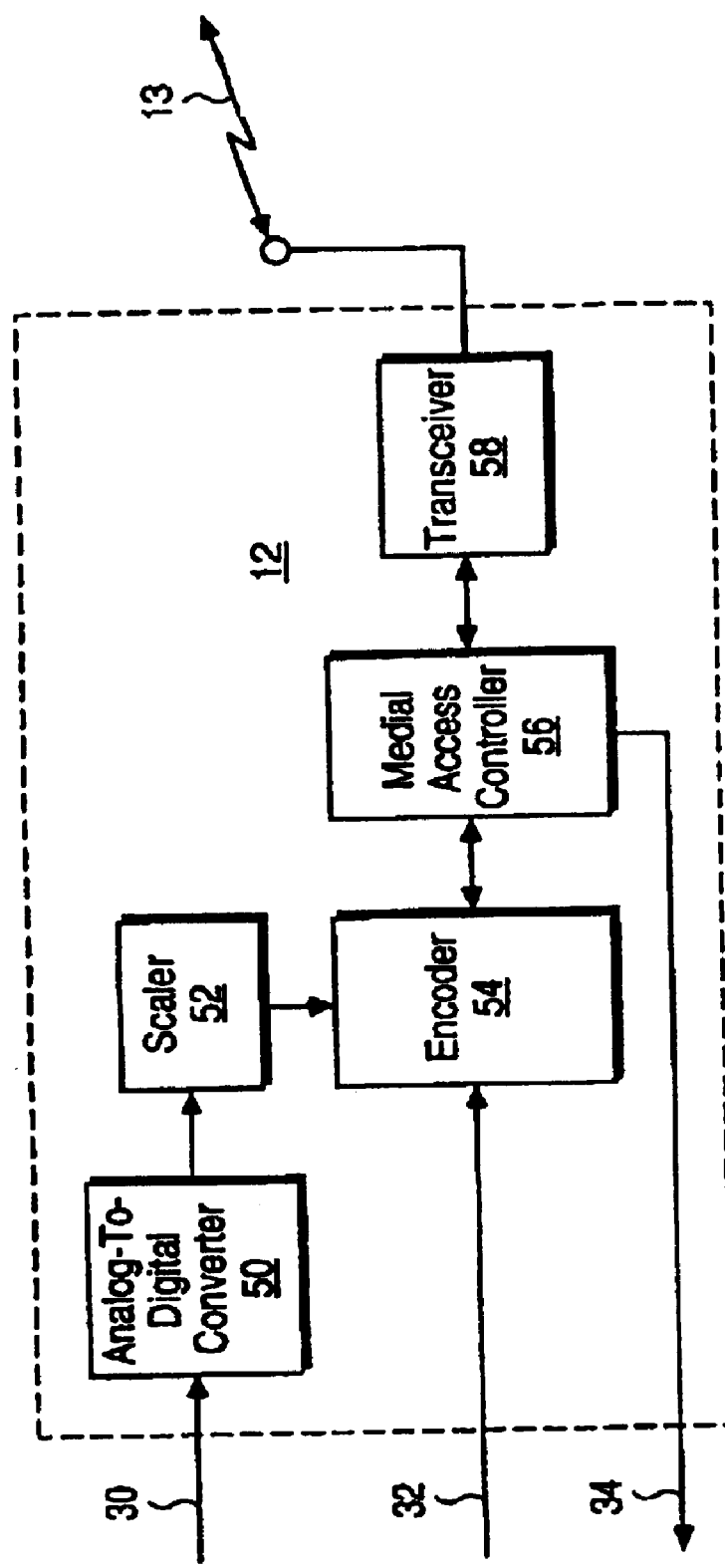
FIG. 2 illustrates one embodiment of a base station which includes an analog-to-digital converter, a scaler, an encoder, a media access controller, and a transceiver.

FIG. 2 illustrates one embodiment of the base station 12 which includes an analog-to-digital converter 50, a scaler 52, an encoder 54, a media access controller 56, and a transceiver 58.

The analog-to-digital converter 50 converts image data carried by analog signals received via the port 30 into RGB digital pixel data values. Thereafter, the image data is handled as a sequence of RGB digital pixel data values. For embodiments in which digital picture data is carried via the port 30, the analog-to-digital converter 50 is replaced with a digital receiver which converts the received digital signals into RGB digital pixel data values.

The scaler 52 converts the image data from the resolution at the port 30 to the resolution of the display 40. For example, if the image data received via the port 30 is 1024×768 resolution and the display 40 is 800×600 resolution then the scaler 52 down-samples the image data to 800×600 resolution. This matches the image data to the resolution of the display 40 and also helps fit the transmitted image data into the bandwidth constraints of the communication link 13. This also enables the implementation of a lower resolution and therefore lower cost display in the screen-pad 14. In embodiments with low resolution image data from the computer system 10 or high bandwidth on the communication link 13 and high resolution on the display 40 the scaler 52 may be omitted.

The encoder 54 obtains image data from the scaler 52 and compresses it for transmission within the bandwidth constraints of the communication link 13. Hardware compression is preferred in that it reduces latency over the communication link 13.

The compression method implemented in the encoder 54 is selected so that users obtain the benefits of the capabilities associated with the computer system 10 but within the bandwidth constraints of the communication link 13. For example, image content generated by the computer system 10 that contains a lot of motion, such as video or game play, should preferably be carried at a minimum of 30 frames per second but without the full resolution of the display 40 in order to fit within the bandwidth constraints of the communication link 13. TV-like resolution may be sufficient for images with a lot of motion. On the other hand, text documents or other static images such as web pages having a relatively low update rate are preferably carried with the full resolution of the display 40.

In one embodiment, the encoder 54 implements a compression method such as MPEG along with an on-demand high-resolution "snapshot" mode that a user activates via a control on the screen-pad 14. MPEG compression is used for moving images and the snapshot mode is used for static images.

In another embodiment, the encoder 54 implements a compression method that is similar to Internet video codecs that use wavelet-based compression. Wavelet-based compression is a streaming protocol that is naturally progressive and enables continual refinement of an image until the image changes. Wavelet-based compression may be used to build up the resolution of a still image over time while a moving image is continually refreshed at a lower resolution.

The encoder 54 obtains audio data via the port 32 which may be, for example, an external speaker connection or a line out connection. The encoder 54 digitizes and compresses the audio data using known PCM techniques for transmission via-the communication link 13.

The media access controller 56 receives compressed data from the encoder 54 and in turn generates the appropriate signals that cause the transceiver 58 to transmit the compressed data via the communication link 13. In one embodiment, the transceiver 58 is an RF transceiver.

Figure 3:
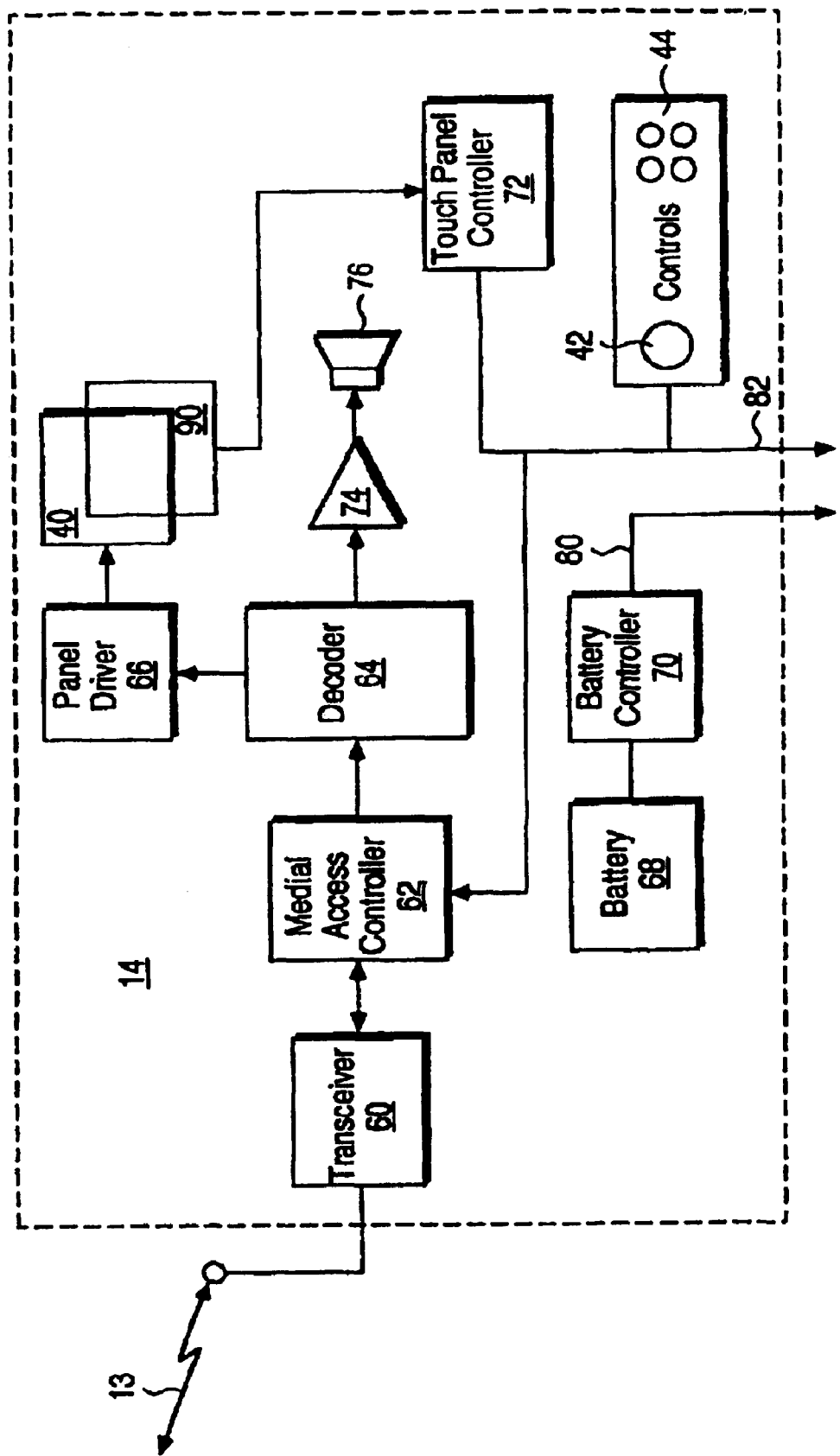
FIG. 3 illustrates one embodiment of a screen-pad which includes a decoder, a flat panel display, and a touch panel.

FIG. 3 illustrates one embodiment of the screen-pad 14. The screen pad 14 includes a transceiver 60 and a media access controller 62 that receive compressed image and audio data from the base station 12 via the communication link 13. A decoder 64 in the screen-pad 14 decompresses the image and audio data using the reverse of the methods used to compress by the encoder 54.

The decoder 64 transfers the decompressed image data which is raw RGB pixel data to a panel driver 66. The panel driver 66 drives the image data onto the display 40. In one embodiment, the display 40 is a flat panel LCD display.

The decoder 64 transfers the decompressed audio data to an amplifier 74. The amplifier 74 drives a speaker 76 in the screen-pad 14. Digital-to-analog conversion of the audio data may be performed by the decoder 64 or a separate digital-to-analog converter. Some embodiments of the screen-pad 14 include stereo speakers and/or a headphone outlet.

The screen-pad 14 includes a touch panel 90 and a touch panel controller 72. The touch panel controller 72 senses areas touched on the touch panel 90 and provides touch panel data to the media access controller 62. Similarly, data from the controls 42–44 is provided to the media access controller 62. In addition, keyboard and mouse data is received via a signal path 82 when the screen-pad 14 is in the screen-pad station 16 and is provided to the media access controller 62.

The media access controller 62 and the transceiver 60 transmit the touch panel data, controls data, and/or keyboard and mouse data back to the base station 12. The media access controller 56 in the base station 12 provides the touch panel data, controls data, and/or keyboard and mouse data to the computer system 10 via the port 34.

The screen-pad 14 includes a battery 68 and a battery controller 70. The battery controller 70 obtains power for charging the battery 68 via a set of power lines 80 when the screen-pad 14 is docked in the screen-pad station 16.

Some embodiments of the base station 12 include support for a conventional monitor and keyboard, etc., directly attached to the computer system 10. For example, the ports 30–34 may be implemented with pass-thru connectors or with Y-cables that connect to a conventional monitor and keyboard and/or speaker system. In these embodiments, the screen-pad 14 provides a duplicate interface to the computer system 10. These embodiments may be combined with hardware and/or software that supports multiple users on the computer system 10 to provide a shared interface to the computer system 10.

A portable user interface according to the present techniques provides flexibility by supporting both the lean-forward and lean-back modes of computer system access. Lean-forward refers to the posture normally associated with typical computer system use and lean-back refers to the more relaxed posture assumed when, for example, reading a book. When the screen-pad 14 is docked in the screen-pad station 16, a nearly cable-free small footprint interface is realized which can be located anywhere without regard to the location of a phone jack or other Internet or network access point. Even when the screen-pad 14 is undocked from the screen-pad station 16, full access is provided to all of the capabilities of the computer system 10 from any location in a home or commercial environment.

A portable user interface according to the present techniques minimizes size, power consumption, and cost by using the minimum necessary hardware to provide a user interface. The portable user interface implements the well understood functionality of keyboard, mouse, and monitor. The physical hookup is simple and preferably uses existing standards. The computer system 10 need not be opened up to install the portable user interface.

A portable user interface according to the present techniques does not impose another computer on a user to administer, backup, network, and depreciate because the already existing computer system 10 is relied on. The portable user interface may be used after upgrade or replacement of the computer system 10. The portable user interface provides access to powerful graphics, video, audio, and storage capabilities of the computer system 10. Such capabilities may include 3D graphical user interfaces, large multimedia files, streaming video, DVD, video from a TV tuner card, mp3 audio, text-to-speech conversion, and speech recognition, to name a few examples. Such capabilities are commonly unavailable or relatively expensive with other portable access systems.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A portable user interface to a computer system, comprising:

base station that connects to a display port of the computer system wherein the display port is adapted to provide a set of raw picture information to a local display of the computer system, the base station compressing the raw picture information that would normally go to the local display and transmitting the raw picture information via a communication link;

screen-pad receiving the raw picture information via the communication link and decompressing the raw picture information, and displaying an image defined by the raw picture information.

2. The portable user interface of claim 1, wherein the raw picture information is carried by a set of analog signals and the base station includes an analog-to-digital converter for digitizing the analog signals.

3. The portable user interface of claim 1, wherein the raw picture information is carried by a set of digital signals and the base station includes a digital receiver for receiving the digital signals.

4. The portable user interface of claim 1, wherein the base station also connects to an audio port of the computer system and compresses a set of audio data carried via the audio port, and transmits the audio data via the communication link.

5. The portable user interface of claim 4, wherein the screen-pad receives the audio data via the communication link, decompresses the audio data, and plays audio defined by the audio data.

6. The portable user interface of claim 1, wherein the screen-pad obtains a set of keyboard data and transmits the keyboard data via the communication link.

7. The portable user interface of claim 6, wherein the screen-pad includes a touch panel for obtaining the keyboard data.

8. The portable user interface of claim 6, wherein the base station receives the keyboard data via the communication link and provides the keyboard data to the computer system.

9. The portable user interface of claim 8, wherein the base station provides the keyboard data to the computer system via a standard keyboard port of the computer system.

10. The portable user interface of claim 1, wherein the screen-pad obtains a set of mouse data and transmits the mouse data via the communication link.

11. The portable user interface of claim 10, wherein the screen-pad obtains the mouse data using a touch panel.

12. The portable user interface of claim 10, wherein the base station receives the mouse data via the communication link and provides the mouse data to the computer system.

13. The portable user interface of claim 12, wherein the base station provides the mouse data to the computer system via a standard mouse port of the computer system.

14. The portable user interface of claim 1, wherein the screen-pad obtains a set of screen-pad control data and transmits the screen-pad control data via the communication link.

15. The portable user interface of claim 14, wherein the base station receives the screen-pad control data via the communication link and provides the screen-pad control data to the computer system.

16. The portable user interface of claim 1, wherein the raw picture information is compressed and decompressed using an encoding method which can vary between a relatively high frame rate at a relatively low resolution of the image and a relatively low frame rate at a relatively high resolution of the image.

17. The portable user interface of claim 1, further comprising a screen-pad station that includes a keyboard and a mouse for use by the screen-pad when docked at the screen-pad station.

18. The portable user interface of claim 1, wherein the base station down samples the raw picture information from a resolution associated with the local display to a resolution associated with a display in the screen-pad.

19. The portable user interface of claim 1, wherein the communication link is a wireless communication link.

20. The portable user interface of claim 1, wherein the communication link is a wire-based communication link.

* * * * *